Nov. 7, 1967

H. BENTLEY-LEEK 3,351,351

MEANS FOR SEALING A SPINDLE

Filed June 3, 1965

Inventor
Herbert Bentley-Leek
By
Watson, Cole, Grindle & Watson
Attys.

United States Patent Office 3,351,351
Patented Nov. 7, 1967

3,351,351
MEANS FOR SEALING A SPINDLE
Herbert Bentley-Leek, Herefordshire, England, assignor to Saunders Valve Company Limited, Cwmbran, Monmouthshire, England, a British company
Filed June 3, 1965, Ser. No. 461,086
Claims priority, application Great Britain, June 5, 1964, 23,471/64
9 Claims. (Cl. 277—115)

ABSTRACT OF THE DISCLOSURE

The invention is a seal for a spindle traversing the wall of a casing and rotatable through a small angle, comprising a taper bushing of nylon or PTFE with an included angle about 25° having its large end on the high pressure side and equipped at this end with a flange clamped to the casing, the bushing being pressed into contact with the spindle by a spring urged compressor having a bore matching the bushing. The flange is preferably unreinforced and the rest of the bushing reinforced with powdered metal, slate, glass or silica, or with fibrous asbestos.

---

Figure 1:
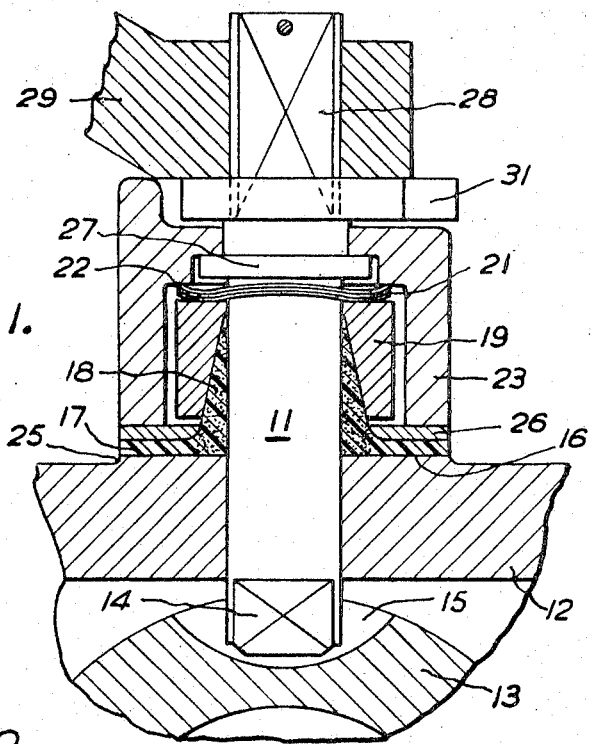

This invention relates to seals for spindles which rotate intermittently through a small angle which may be less than 360°, for example the spindles of plug cocks in which on account of the nature of the fluid to be confined, a material such as nylon or polytetrafluoroethylene (PTFE) is used to make the joint with the spindle. These materials present adequate chemical resistance for various media though PTFE tends to wear more rapidly than is desirable. An object of the present invention is to provide a seal in which wear can be compensated and in which the rate of wear is kept to an acceptable value.

According to the invention, the seal comprises a tapered bushing of the material (nylon or PTFE), reinforced with a filler, which is a good working fit on the spindle, a flange integral with the larger diameter end of the taper which is sealed to the casing to which the spindle is to be sealed, a compressor having a tapered bore which fits on the bushing, and spring means urging the compressor into closer contact with the bushing.

The spring action on the compressor induces a radial load in the bushing and since the material of the bushing has some flexibility, this results in a good joint being made with the spindle and the constant spring pressure maintains this joint notwithstanding some wear of the bushing. Also by disposing the seal suitably, i.e. so that the pressure drop is from the larger diameter end towards the smaller diameter end, the pressure tends to urge the bushing into the compressor thus increasing the joint making pressure as the pressure drop increases.

It will be seen that the slower the taper, the greater the mechanical advantage and therefore the greater the radial pressure induced by the spring action, but also the greater the endwise movement of the compressor for a given amount of wear of the bushing. A good practical compromise is to make the inclined angle of taper within a degree or two either way from 25°.

Reinforcement of the bushing with a filler increases the resistance to abrasive wear. Suitable fillers are metal (stainless steel), slate, asbestos, glass or silica in powder form or abestos in fibrous form. Since the bore of the bushing needs to be machined after moulding, the filler, if of glass or silica, should not amount to more than 10 to 15 percent by weight, whereas, if of stainless steel grindings, up to 90 percent may be used. Also, if the particles of filler are of spherical form, the proportion should not be too high because if it is, as the bushing wears the particles tend to come out of the moulded material. However, in the case of silica, the limit imposed by the need for machining is lower than that which would ensure retention of the particles. In practice, good results have been obtained in the case of PTFE with 10 percent silica.

Since the flange of the bushing is not exposed to abrasive wear, the flange may be free of the reinforcing filler since this makes it easier to seal the flange to the casing by simple clamping.

The accompanying drawing illustrates an embodiment of the invention applied to the sealing of the spindle of a plug cock.

Figure 2:
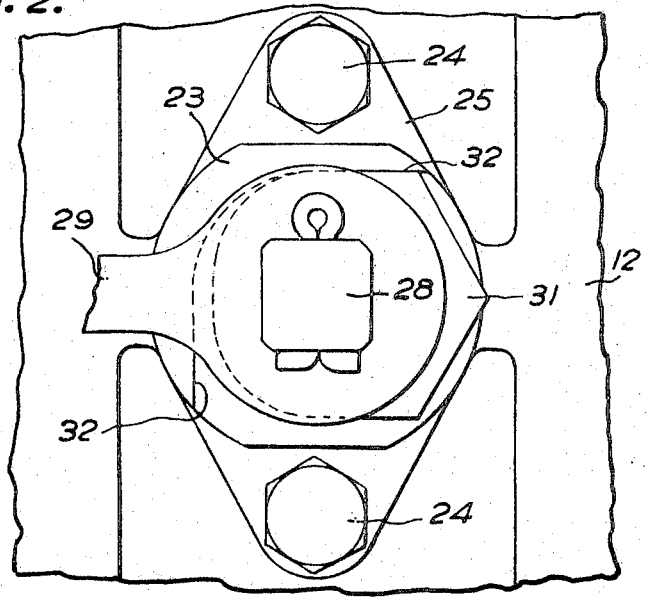

FIGURE 1 is a section on the axis of the spindle, and FIGURE 2 is a plan view.

In the illustrated example, the spindle 11 extends through a bore in the cock casing 12 and in this case is separate from a plug 13 of spherical form, the spindle terminating in a non-circular portion 14 engaging in a slot 15 in the plug.

On the outside, the casing 12 has a flat facing 16 against which seats a flange 17 formed integrally with a taper bushing 18, the flange and bushing being of nylon or PTFE according to the fluid to be controlled. The bushing is shown reinforced with a filler which is confined to the bushing proper 18, leaving the flange 17 unreinforced. The taper bushing 18 tapers outwardly with an included angle of 25° and is a good working fit on the spindle 11.

Over the bushing 18 fits a correspondingly bored metal compressor 19 which is urged axially further on to the bushing by spring washers 21 abutting a shoulder 22 rigid with the case. In this example the shoulder is formed in a cap 23 which is bolted to the casing 12 by bolts 24 shown in FIGURE 2 traversing lugs 25 on the cap 23. The cap also serves to apply pressure to the flange 17 whereby the latter is sealed to the facing 16. Since the internal diameter of the cap 23 has to clear the compressor 19, a rigid metal washer 26 is interposed between the cap and the flange 17 so that the whole width of the flange 17 is adequately supported and distortion of the flange 17 and facing 16 by by pressure of the medium penetrating between the flange 17 and facing 16 is avoided. The drawing shows spring washers 21 of waved form but instead Belleville washers may be used. A suitable value of the spring pressure will depend on the diameter of the spindle. For a spindle of 7/16 inch (11 mm.) diameter it may be 600 lbs. (270 kg.) while for a spindle of 7/8 inch (22 mm.) diameter it may be 1000 lbs. (450 kg.), though the appropriate value will also depend on the pressure difference between the inside and outside of the casing.

The drawing also shows the spindle provided with an integral flange 27 which is overlapped by the cap 23 thus preventing the spindle from being withdrawn accidentally and further shows the spindle with a squared end 28 through which it can be rotated by means of a hand-lever 29 to open and close the cock, and a stop member 31 on the squared end 28 which limits rotation of the spindle to 90° by engagement with abutments 32 on the cap.

It will be understood that such details as the flange 27, squared end 28 and hand-lever 29 and stop arrangements 31, 32, may be varied according to the manner in which the cock is to be actuated, and further that the invention is not limited to sealing the spindle of a plug cock but is applicable in any place where a spindle has similarly to be sealed to a casing through which it passes.

What I claim is:

1. A seal for sealing to a casing a spindle which rotates intermittently through a small angle, comprising a tapered bushing of material selected from the group consisting of nylon and PTFE reinforced with a filler, which is a good working fit on the spindle, a flange integral with the larger diameter end of the taper, said flange being clamped and thereby sealed to the casing to which the spindle is to be sealed and the bushing being disposed with the flange at the high pressure end of the seal, a compressor of rigid material having a tapered bore which fits on the bushing, and spring means urging the compressor into closer contact with the bushing.

2. A seal according to claim 1 in which the taper of the bushing has an included angle within two degrees either way from 25°.

3. A seal according to claim 1 in which the filler is of material selected from the group consisting of metal, slate, asbestos, glass and silica in powder form and asbestos in fibrous form.

4. A seal according to claim 1 in which the filler is of silica in powder form amounting to 10 percent by weight.

5. A seal according to claim 1 in which the flange is free of the reinforcing filler.

6. A seal according to claim 1 in which the spring means comprises spring washers of waved form engaging between the end of the compressor and a shoulder rigid with the casing.

7. A seal according to claim 6 in which the shoulder is formed in a cap which is secured to the casing and clamps the flange on the bushing and thereby seals it to the casing.

8. A seal according to claim 7 in which a rigid metal washer is interposed between the cap and flange to support the latter over its whole width.

9. A seal according to claim 7 in which the spindle has an integral flange which is overlapped by the cap thus preventing the spindle from being withdrawn accidentally.

References Cited

UNITED STATES PATENTS

| | | |
|---|---|---|
| 2,891,921 | 8/1959 | Kumnick et. al. |
| 2,950,898 | 8/1960 | Voss _____ 251—214 |
| 2,998,987 | 9/1961 | Taschenberg et al. |
| 3,096,096 | 7/1963 | Banks _____ 277—117 |
| 3,239,191 | 3/1966 | Widera _____ 251—315 X |

SAMUEL ROTHBERG, *Primary Examiner.*